D. FAIRLEY.
RUNNING GEAR FOR MOTOR VEHICLES.
APPLICATION FILED MAY 13, 1912. RENEWED JAN. 16, 1914.
1,088,888.
Patented Mar. 3, 1914.
2 SHEETS—SHEET 1.
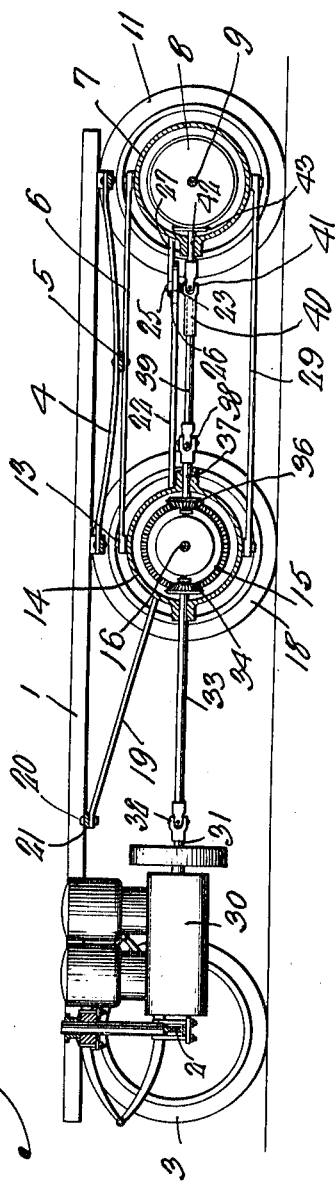
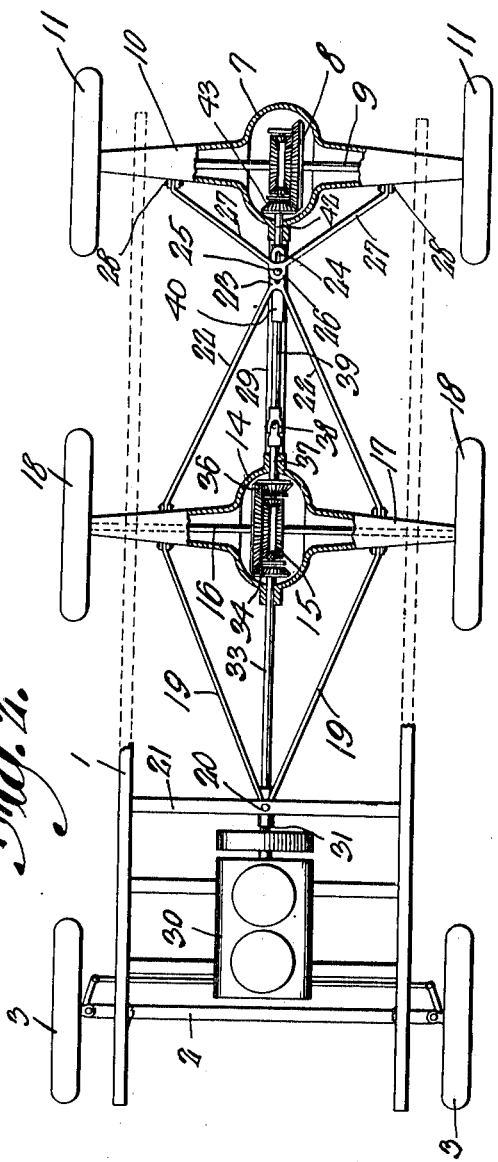
Witnesses
David Fairley, Inventor
by C. A. Snow & Co., Attorneys

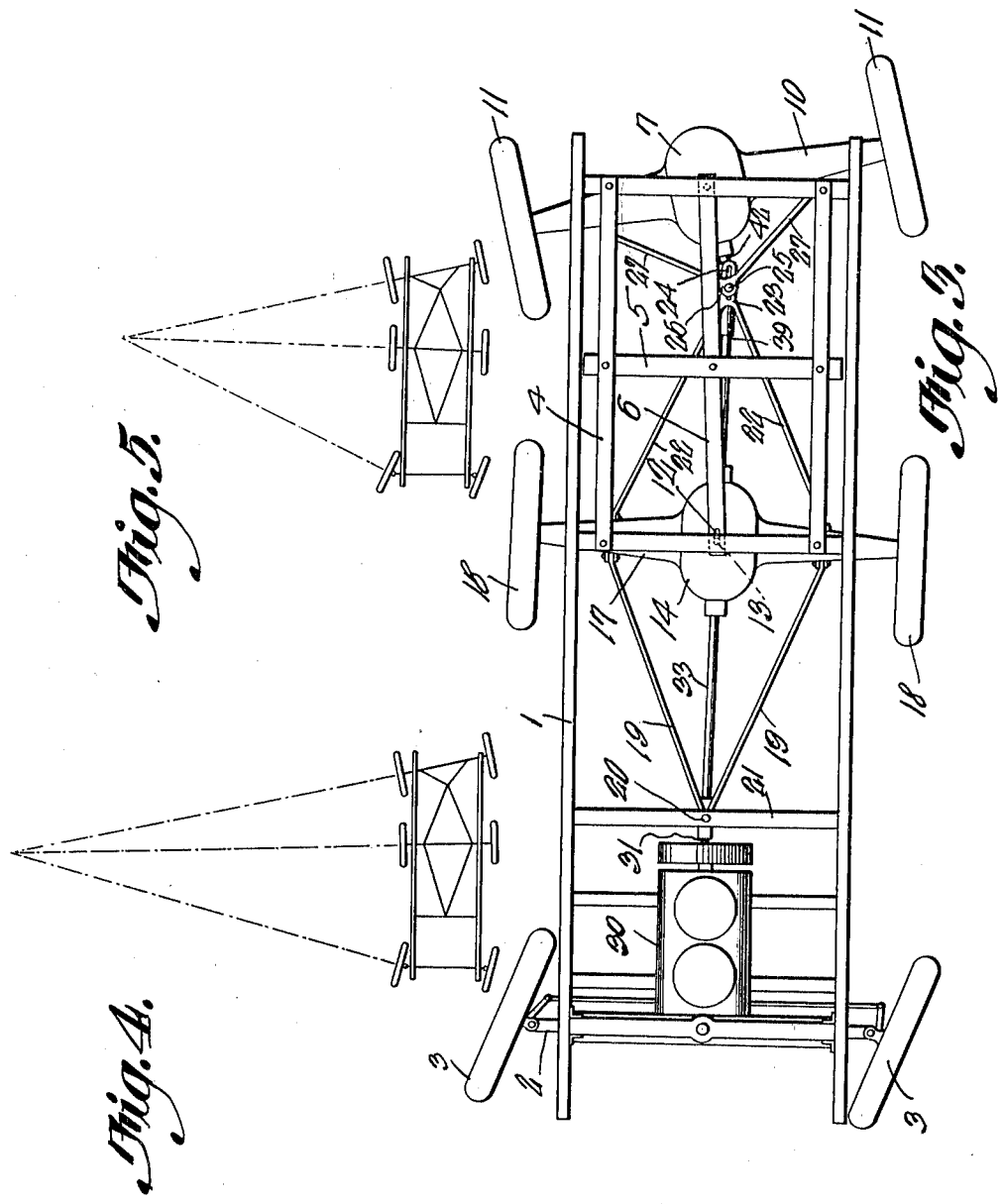

UNITED STATES PATENT OFFICE.

DAVID FAIRLEY, OF HATTIESBURG, MISSISSIPPI.

RUNNING-GEAR FOR MOTOR-VEHICLES.

1,088,888.  Specification of Letters Patent.  Patented Mar. 3, 1914.

Application filed May 13, 1912, Serial No. 697,010. Renewed January 16, 1914. Serial No. 812,587.

*To all whom it may concern:*

Be it known that I, DAVID FAIRLEY, a citizen of the United States, residing at Hattiesburg, in the county of Forest and State of Mississippi, have invented a new and useful Running-Gear for Motor-Vehicles, of which the following is a specification.

This invention relates to running gears for motor vehicles, its principal object being to provide a structure of this character including six supporting wheels four of which are located back of the center of the vehicle and constitute driving means.

A further object is to provide means whereby the axles of the driving wheels are permitted to shift bodily during the movement of the vehicle along a curved path, for the purpose of adjusting the axes of the wheels automatically to the center of the arc traveled by the vehicle.

A further object is to provide improved means whereby the weight of the rear portion of the vehicle will be transmitted to the four drive wheels without, however, interfering with the automatic adjustment of said wheels so that their axes will converge to a common point.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

In said drawings:—Figure 1 is a vertical longitudinal section through the running gear and the chassis supported thereby, the drive mechanism being shown in elevation. Fig. 2 is a plan view with portions removed and the differential casings in section. Fig. 3 is a top plan view of the apparatus. Figs. 4 and 5 are views, in diagram, showing how the axes of rotation of the wheels of the vehicle converge toward a common point which is the center of the arc traveled by the vehicle.

Referring to the figures by characters of reference 1 designates the chassis of a motor vehicle, the same being mounted, as ordinarily, upon a front axle 2 which is fixed relative to said chassis and has the ordinary steering wheels 3 connected thereto. These wheels may be shifted in the ordinary manner and it has not been deemed necessary in the present case to illustrate the means provided for operating the steering wheels.

The rear portion of the chassis is mounted on springs 4 supported by a cross bar 5 to the middle portion of which is pivotally connected the middle portion of a longitudinally extending lever 6. One end of this lever is pivotally connected to the top of the casing 7 of the differential gear 8 from which extend the spaced alining rear shaft sections 9 which, as shown in Fig. 2, are housed within a rear axle or housing 10. The rear drive wheels 11 are secured to the shaft sections 9 as ordinarily and the casing 10 is located below and is movable independently of the chassis 1. The front end of the lever 6 is slotted, as shown at 12 and receives a pivot pin 13 extending upwardly from the center of the casing 14 of the differential gear 15 carried by the sections 16 of the front drive axle. These sections 16 are housed within an axle or housing 17 and front drive wheels 18 are secured to the axle sections 16. The housing 17 is located under and is movable independently of the chassis 1 and has forwardly diverging draw bars 19 pivotally connected thereto at opposite sides of the differential casing 14, these bars 19 being connected at their front ends and being pivotally attached, as at 20, to one of the cross strips 21 of the chassis. Thus it will be seen that during the forward movement of the vehicle the axle or housing 17 is free to swing laterally about the pivot 20 as a center and, during such movement, lever 6 will be swung about its pivot so as to shift the rear axle or housing 10 laterally in the opposite direction.

In order that the two axles or housings 10 and 17 may be automatically held at proper angles relative to each other during this lateral shifting of the axles, the front housing 17 has rearwardly diverging arms 22 pivotally connected thereto and merging into or secured to a rearwardly extending tongue 23 having a longitudinal slot 24. This slot receives a pin 25 which is slidable therein and extends from a tongue 26. Said last named tongue is arranged at the front ends of forwardly converging arms 27 pivotally connected as at 28, to the rear axle or housing 10. Thus it will be seen that when the front axle or housing 17 swings laterally in one direction about its pivot 20 and lever 6 thus causes the rear axle or housing 10 to swing laterally in the opposite direction, the slotted tongue 23 will coöperate with the pin 25 to cause the rear axle or housing 10 to swing upon its pivotal connection with the lever 6, as shown particularly in Fig. 3. The parts are so adjusted that when the wheels 3 are shifted so as to cause the vehicle to travel along a curved path, the axle casing 7 will shift laterally about its pivot 20 until the axis of rotation of the shaft section 16 will intersect the axes of rotation of the wheels 3 at a point which is the center of the circle traveled by the vehicle. This adjustment of the shaft section 16 and the wheels 18 will be automatic inasmuch as should said wheels 18 assume any other positions than with their axes of rotation extending to the center of the circle traveled by the vehicle, they would drag. Obviously the wheels, when connected freely to the vehicle chassis by means of a single pivot 20, will adjust themselves to the path of least resistance. As the wheels 18 adjust themselves to this position, lever 6 causes the housing 10 to shift laterally and, at the same time, the tongue 23 coöperates with the pin 25 to swing the axle or housing 10 so as to bring the axis of rotation of the wheels 11 into a line extending from the center of the circle traveled by the vehicle.

In order to reinforce the connection between the front and rear housings 10 and 17, a link 29 is preferably extended under the casings 7 and 14 and parallel with the lever 6, this link being pivotally connected to the housings 7 and 14.

The means employed for transmitting motion to the drive wheels includes a motor 30 which can be of any suitable type and is located under or within the front portion of the chassis 1. The drive shaft 31 of the motor is connected, by a universal joint 32, to a shaft 33 having a gear 34 designed to actuate the differential 15. The universal joint 32 is located directly under the pivot 20 so that, when the axle or housing 17 swings laterally about its pivot 20, shaft 33 can move freely therewith without danger of distortion. A gear 36 receives motion from the differential 15 and is secured to a shaft 37 which, in turn, is connected by means of a universal joint 38, to a shaft section 39. This shaft section telescopes into another shaft section 40 which is connected, by means of a universal joint 41, to a shaft 42 journaled in the housing 7 and having a gear 43 for transmitting motion to the differential 8. Thus it will be seen that, by providing this arrangement of shafts and gears, motion may be transmitted from motor 30 to the two differentials 15 and 8 and by said differentials simultaneously to the four driving wheels 11 and 18. This movement will not be affected by the relative movement of the axles or housing 10 and 17 and the movement of said housings relative to the chassis.

What is claimed is:—

1. A motor vehicle including a non-flexible body, three sets of wheels therefor, one set constituting front steering wheels, an axle in rear of said first set and adapted to swing laterally relative to the chassis of the vehicle and about a point in front of the axle, the second set of wheels constituting front drive wheels and supporting said axle, a rear axle supported by the third set of wheels which constitute rear driving wheels, and coöperating means upon the axles for maintaining the axes of rotation of the wheels in lines converging to a point constituting the center of any circle within which the vehicle may be traveling.

2. A motor vehicle including front steering wheels, an axle in rear thereof adapted to swing laterally relative to the chassis of the vehicle and about a point in front of the axle, front drive wheels supporting said axle, a rear axle, rear driving wheels supporting the same, and coöperating means upon the axles for maintaining the axes of rotation of the wheels in lines converging to a point constituting the center of any circle in which the vehicle may be traveling.

3. A motor vehicle including front steering wheels, an axle in rear thereof adapted to swing laterally relative to the chassis of the vehicle and about a point in front of the axle, front drive wheels supporting said axle, a body supporting lever pivoted at one end to said axle, a rear axle pivoted to the other end of the lever, drive wheels supporting the rear axle, and coöperating means upon the two axles for maintaining the axes of rotation of the drive wheels along lines intersecting the center of the concentric circles traveled by the steering wheels.

4. A motor vehicle including front steering wheels, an axle in rear thereof adapted to swing laterally relative to the chassis of the vehicle and about a point in front of the axle, front drive wheels supporting said axle, a cross bar constituting a body supporting element, a lever pivoted at its center upon said bar and at one end to the center of the axle, a rear axle pivoted at its center to the other end of the lever, drive wheels supporting the rear axle, and coöperating means upon the two axles for maintaining the axes of rotation of the drive wheels along lines extending to a point constituting the center of the concentric circles traveled by the steering wheels.

5. A motor vehicle including front steering wheels, an axle in rear thereof adapted to swing laterally relative to the chassis of the vehicle and about a point in front of the axle, front drive wheels supporting said axle, a cross bar constituting a body supporting element, a lever pivoted at its center upon said bar and at one end to the center of the axle, a rear axle pivoted at its center to the other end of the lever, drive wheels supporting the rear axle, a longitudinally slotted tongue interposed between the axles and connected to one of them, and means slidably engaging said tongue and connected to the other axle for varying the angles of the axles relative to each other during the actuation of the lever.

6. A motor vehicle including front steering wheels, an axle in rear thereof adapted to swing laterally relative to the chassis of the vehicle and about a point in front of the axle, front drive wheels supporting said axle, a cross bar constituting a body supporting element, a lever pivoted at its center upon said bar and at one end to the center of the axle, a rear axle pivoted at its center to the other end of the lever, drive wheels supporting the rear axle, a longitudinally slotted tongue interposed between the axles and pivotally connected to one of them, and means slidably engaging the tongue and pivotally connected to the other axle for varying the angle of the axles relative to each other during the actuation of the lever to maintain the axes of rotation of the drive wheels along lines converging to a point constituting the center of the circles traveled by the steering wheels.

7. A motor vehicle including front steering wheels, an axle in rear thereof adapted to swing laterally relative to the chassis of the vehicle and about a point in front of the axle, front drive wheels supporting said axle, a rear axle, rear driving wheels supporting the same, coöperating means upon the axles for maintaining the axes of rotation of the wheels in line converging to a point constituting the center of any circle in which the vehicle may be traveling, a motor, and means for transmitting motion therefrom to all of the drive wheels irrespective of the positions of the axles relative to the chassis.

8. A motor vehicle including front steering wheels, an axle in rear thereof adapted to swing laterally relative to the chassis of the vehicle and about a point in front of the axle, front drive wheels supporting said axle, a body supporting lever pivoted at one end to said axle, a rear axle pivoted to the other end of the lever, drive wheels supporting the rear axle, coöperating means upon the two axles for maintaining the axes of rotation of the drive wheels along lines intersecting the center of the concentric circles traveled by the steering wheels, a motor, and means for transmitting motion therefrom to all of the drive wheels irrespective of the positions of the axles relative to the chassis.

9. A motor vehicle including a non-flexible body, three sets of wheels therefor, one set of wheels constituting front steering wheels, an axle in rear of said first set of wheels, and supported by the second set of wheels, means for automatically adjusting said axle for bringing the axis of rotation of its supporting wheels into a line intersecting the axis of rotation of the steering wheels at the center of any circle within which the vehicle may be traveling, a rear axle supported by a third set of wheels, coöperating means upon said axles for adjusting the rear axle to bring the axis of rotation of its supporting wheels into a line extending to said point, a motor, and means for transmitting motion therefrom to all of the drive wheels irrespective of the positions of the axles relative to the chassis.

10. A motor vehicle including front steering wheels, an axle in rear thereof adapted to swing laterally relative to the chassis of the vehicle and about a point in front of the axle, front drive wheels supporting said axle, a cross bar constituting a body supporting element, a lever pivoted at its center upon said bar and at one end to the center of the axle, a rear axle pivoted at its center to the other end of the lever, drive wheels supporting the rear axle, coöperating means upon the two axles for maintaining the axes of rotation of the drive wheels along lines extending to a point constituting the center of the concentric circles traveled by the steering wheels, a motor, and means for transmitting motion therefrom to all of the drive wheels irrespective of the positions of the axles relative to the chassis.

In testimony that I claim the foregoing as my own, I have hereto affixed my signature in the presence of two witnesses.

DAVID FAIRLEY.

Witnesses:
T. M. FULLER,
W. R. HARDY.